United States Patent
Hong et al.

(10) Patent No.: US 11,368,329 B2
(45) Date of Patent: Jun. 21, 2022

(54) DEVICE AND METHOD FOR DIVIDING FIELD BOUNDARY OF CAN TRACE

(71) Applicant: AJOU UNIVERSITY INDUSTRY-ACADEMIC COOPERATION FOUNDATION, Suwon-si (KR)

(72) Inventors: Man Pyo Hong, Suwon-si (KR); Cheong Min Ji, Suwon-si (KR); Ji Min Kim, Yongin-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 638 days.

(21) Appl. No.: 16/100,366

(22) Filed: Aug. 10, 2018

(65) Prior Publication Data
US 2019/0296935 A1 Sep. 26, 2019

(51) Int. Cl.
*H04L 12/40* (2006.01)
*H04L 67/12* (2022.01)

(52) U.S. Cl.
CPC .............. *H04L 12/40* (2013.01); *H04L 67/12* (2013.01); *H04L 2012/40215* (2013.01); *H04L 2012/40273* (2013.01)

(58) Field of Classification Search
CPC ...................... H04L 12/40; H04L 67/12; H04L 2012/40215; H04L 2012/40273
See application file for complete search history.

(56) References Cited

U.S. PATENT DOCUMENTS

2015/0161098 A1 6/2015 Granshaw et al.
2020/0228322 A1* 7/2020 Bridges ................. H04L 9/0822

FOREIGN PATENT DOCUMENTS

KR  10-1095583 B1  12/2011

OTHER PUBLICATIONS

Moti Markovitz et al., "Field classification, modeling and anomaly detection in unknown CAN bus networks", Vehicular Communications, Elsevier Inc., vol. 9, 2017, pp. 43-52 (Year: 2017).*
Moti Markovitz et al., "Field classification, modeling and anomaly detection in unknown CAN bus networks", Vehicular Communications, Elsevier Inc., vol. 9, 2017, pp. 43-52.
Communication dated Mar. 18, 2019, issued by the Korean Patent Office in counterpart Korean Patent Application No. 10-2018-0033525.

* cited by examiner

*Primary Examiner* — Mahmoud S Ismail
*Assistant Examiner* — Gabriel Anfinrud
(74) *Attorney, Agent, or Firm* — Sughrue Mion, PLLC

(57) ABSTRACT

The present disclosure relates to a device and method for dividing a field boundary of a CAN trace. The method for dividing a field boundary of a CAN trace according to an embodiment of the present disclosure includes: collecting a CAN trace of a CAN bus; dividing the CAN trace into multiple blocks including multiple frames of the CAN trace; performing first static field division to each of the multiple blocks; and performing second static field division based on the result of the first static field division to divide a final field boundary of the CAN trace.

8 Claims, 9 Drawing Sheets

FIG.2

```
; Message Number
;   |   Time Offset (ms)
;   |       |       Type
;   |       |       |       ID (hex)
;   |       |       |       |   Data Length
;   |       |       |       |       Data Bytes (hex) ...
;   |       |       |       |       |
;---+-------+-------+-------+---+---------------------
    1)  342732.6    Rx      02B0    5   7E FD 00 07 2E
    2)  342734.5    Rx      04F0    8   80 00 1A 00 00 DD CD 10
    3)  342734.8    Rx      0350    8   00 20 B2 77 79 00 00 9C
    4)  342735.0    Rx      02C0    8   01 00 00 00 00 00 00 00
    5)  342735.7    Rx      0580    8   00 00 00 00 00 00 00 00
    6)  342736.5    Rx      0316    8   31 1E E8 0A 1E 17 00 7F
    7)  342736.8    Rx      018F    8   00 2C 1E 00 00 43 00 00
    8)  342737.0    Rx      0080    8   00 17 E8 0A 1E 17 1E 11
    9)  342737.2    Rx      0081    8   80 84 63 00 00 00 00 21
   10)  342737.4    Rx      0260    8   05 1E 00 30 28 92 4F 10
   11)  342737.7    Rx      02A0    8   A2 00 63 9C 5D 04 F5 00
   12)  342737.9    Rx      0329    8   0F A8 7F 0C 12 2A 00 10
   13)  342738.2    Rx      0545    8   D8 11 00 8B 39 00 3A 00
   14)  342738.5    Rx      043F    8   00 40 60 FF 4A 80 09 00
   15)  342738.8    Rx      0370    8   FF 20 00 00 FF 00 00 20
   16)  342739.0    Rx      0440    8   FF 00 00 00 FF 84 09 00
   17)  342742.1    Rx      02B0    5   7C FD 00 07 1F
   18)  342744.7    Rx      0350    8   00 20 C2 77 79 00 00 EC
   19)  342744.9    Rx      02C0    8   01 00 00 00 00 00 00 00
   20)  342747.3    Rx      0316    8   31 1E CE 0A 1F 17 00 7F
   21)  342747.5    Rx      0080    8   00 17 CE 0A 1E 17 1F B2
   22)  342747.7    Rx      0081    8   80 84 63 00 00 00 00 12
   23)  342748.0    Rx      018F    8   00 2C 1F 00 00 43 00 00
   24)  342748.2    Rx      0260    8   05 1F 00 30 28 93 51 2A
   25)  342748.5    Rx      02A0    8   C2 00 63 9C 5D 04 F5 00
   26)  342748.7    Rx      0329    8   0F A8 7F 0C 12 2A 00 10
   27)  342748.9    Rx      0370    8   FF 20 00 00 FF 00 00 E4
   28)  342749.2    Rx      043F    8   00 40 60 FF 4A 80 09 00
   29)  342749.4    Rx      0440    8   FF 50 00 00 FF 84 09 00
   30)  342749.6    Rx      0545    8   D8 11 00 8B 38 00 3C 00
   31)  342751.7    Rx      02B0    5   7C FD 00 07 E0
   32)  342754.6    Rx      04F0    8   80 00 1C 00 00 DD CD 10
```

FIG.3

```
function split_static($d_0, d_1, ..., d_{m-1}$)
    $S \leftarrow 0$
    for $i$ in [0:$m$-1]   # m-1 exclusive
        $S \leftarrow S \vee (d_i \oplus d_{i+1})$
    end for
    return groupby($S$)
```

FIG.4

```
function subdivide(pos_l, pos_r, sen)
    # pos_l: position of the left-most bit
    # pos_r: position of the right-most bit
    # sen: sensitivity
    fields ← []
    if pos_r = pos_l then
        fields.append(Field(pos_l, pos_r))
        return fields
    end if
    ptr_l ← pos_l
    ptr_r ← pos_r
    while ptr_r ≤ pos_r do
        n_pos_r = get_n_pos_r(ID, pos_r)
        # get_n_pos_r: get the number of identical
                      pos_r from R_0,...,R_{k-1} of
                      a given ID
        if n_pos_r / k > 1-sen or
           ptr_r = pos_r do
            fields.append(Field(ptr_l, ptr_r))
            ptr_l ← ptr_r + 1
        end if
        ptr_r ← ptr_r + 1
    end while
```

FIG.5

DEVICE AND METHOD FOR DIVIDING FIELD BOUNDARY OF CAN TRACE

CROSS-REFERENCE TO RELATED APPLICATION

This application claims the benefit of Korean Patent Application No. 10-2018-0033525 filed on Mar. 22, 2018, the disclosures of which are incorporated herein by reference.

TECHNICAL FIELD

The present disclosure relates to a device and method for dividing a field boundary of a CAN trace.

BACKGROUND

There are various electronic control units (ECUs) in a vehicle, and the ECUs transmit and receive messages such as sensor information, control information, etc. to and from each other through a bus-type in-vehicle network. Today, most of vehicles uses CAN (Controller Area Network), developed by Bosch in 1986, as a communication standard for in-vehicle networks. However, when the CAN was designed, security was not considered at all, which has recently become a basic cause of various attacks targeting vehicles. In order to overcome this problem, the CAN needs to be replaced by CAN-FD, FlexRay, MOST, ethernet, etc. However, it is difficult to immediately shift from CAN-based technologies developed so far to other technologies or to dispose of all of previous model vehicles on the roads in a short time. Therefore, research on security under the CAN-based in-vehicle communication environment needs to be conducted.

Further, regarding the security of CAN-based in-vehicle communication, the specification of the CAN as a data link layer protocol have been well known, but data field regions within a CAN frame correspond to upper layers and are different in message format depending on vehicle manufacturer and vehicle model. A message format for each manufacture and each vehicle model is not easily disclosed. Therefore, it is difficult to research a new CAN-based security technology without such information. That is, research on the security of vehicles has been conducted by detecting an attack from the outside other than normal packets through anomaly detection or objectively evaluating a security level and detecting a weak point of a specific in-vehicle network against an attack from the outside through fuzzing test, but such research has clear limitations.

The background technology of the present disclosure is disclosed in Korean Patent No. 10-1095583.

SUMMARY

In view of the foregoing, the present disclosure provides a device and method for dividing a field boundary of a CAN trace by inferring the boundary between data field regions of the CAN trace.

Further, the present disclosure provides a device and method for dividing a field boundary of a CAN trace which can be applied to a CAN frame whose CAN protocol message format is not disclosed.

However, problems to be solved by the present disclosure are not limited to the above-described problems. There may be other problems to be solved by the present disclosure.

According to an aspect of the present disclosure, there is provided a method for dividing a field boundary of a CAN trace, including: collecting a CAN trace of a CAN bus; dividing the CAN trace into multiple blocks including multiple frames of the CAN trace; performing first static field division to each of the multiple blocks; and dividing a final field boundary of the CAN trace by performing second static field division based on the result of the first static field division.

According to an embodiment of the present disclosure, the performing of the first static field division may include generating a first field division frame by performing the first static field division to each of frames having the same ID value among frames included in each of the multiple blocks.

According to an embodiment of the present disclosure, the dividing of the final field boundary of the CAN trace may include: performing the second static field division to the first field division frame for the same ID value; and generating a second field division frame for each predetermined sensitivity based on the result of the second static field division.

According to an embodiment of the present disclosure, the generating of the second field division frame may include dividing a field boundary of the second field division frame based on the sensitivity.

According to an embodiment of the present disclosure, each of the multiple blocks may include a predetermined number of multiple consecutive frames in the CAN trace.

According to an embodiment of the present disclosure, the first static field division may be performed to divide a constant field having the same fixed value with respect to the same bit streams of each frame included in the block from a variable field having at least one different value between the same bit streams.

According to an embodiment of the present disclosure, the performing of the second static field division may be performed to divide a constant field having the same fixed value with respect to the same bit streams of each first field division frame from a variable field having at least one different value between the same bit streams.

According to an embodiment of the present disclosure, in the dividing of the field boundary, the presence or absence of a field boundary of the second field division frame may be sequentially determined from the lowest bit stream of the second field division frame, and if a ratio of the number of blocks including a variable field in a bit stream of the first field division frame for the same ID value and the number of the blocks exceeds a predetermined threshold value, the bit stream including the variable field may be determined as the field boundary.

According to an embodiment of the present disclosure, if a length of a constant field prior to the bit stream determined as the field boundary is equal to or smaller than a predetermined length Tm, the bit stream determined as the field boundary and a bit stream of the constant field may be merged in the generating of the second field division frame.

According to another aspect of the present disclosure, there is provided a device for dividing a field boundary of a CAN trace, including: a block unit that collects a CAN trace of a CAN bus and divides the CAN trace into multiple blocks including multiple frames of the CAN trace; a field division frame generation unit that performs first static field division to each of frames having the same ID value among frames included in each of the multiple blocks; and a boundary determining unit that divides a final field boundary of the CAN trace by performing second static field division based on the result of the first static field division.

According to an embodiment of the present disclosure, the boundary determining unit may perform the second static field division to the first field division frame for the same ID value, generate a second field division frame for each predetermined sensitivity based on the result of the second static field division, and divide a field boundary of the second field division frame based on the sensitivity.

According to an embodiment of the present disclosure, the first static field division may be performed to divide a constant field having the same fixed value with respect to the same bit streams of each frame included in the block from a variable field having at least one different value between the same bit streams.

According to an embodiment of the present disclosure, the boundary determining unit may sequentially determine the presence or absence of a field boundary of the second field division frame from the lowest bit stream of the second field division frame, and if a ratio of the number (u) of blocks including a variable field in a bit stream of the first field division frame for the same ID value and the number (k) of the blocks exceeds a predetermined threshold value, the boundary determining unit may determine the bit stream including the variable field as the field boundary.

The above-described embodiments are provided by way of illustration only and should not be construed as liming the present disclosure. Besides the above-described embodiments, there may be additional embodiments described in the accompanying drawings and the detailed description.

According to the above-described aspect of the present disclosure, it is possible to provide a device and method for dividing a field boundary of a CAN trace by inferring the boundary between data field regions of the CAN trace.

According to the above-described aspect of the present disclosure, it is possible to provide a device and method for dividing a field boundary of a CAN trace which can be applied to a CAN frame whose CAN protocol message format is not disclosed.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 2 is a diagram illustrating a CAN trace collected by a device for dividing a field boundary of a CAN trace according to an embodiment of the present disclosure.

FIG. 3 is a diagram illustrating an example of first static field division by a device for dividing a field boundary of a CAN trace according to an embodiment of the present disclosure.

FIG. 4 is a diagram illustrating an example of subfield division by a device for dividing a field boundary of a CAN trace according to an embodiment of the present disclosure.

FIG. 5 is a diagram illustrating an example where a field boundary for each sensitivity is divided by a device for dividing a field boundary of a CAN trace according to an embodiment of the present disclosure.

DETAILED DESCRIPTION

Figure 1:
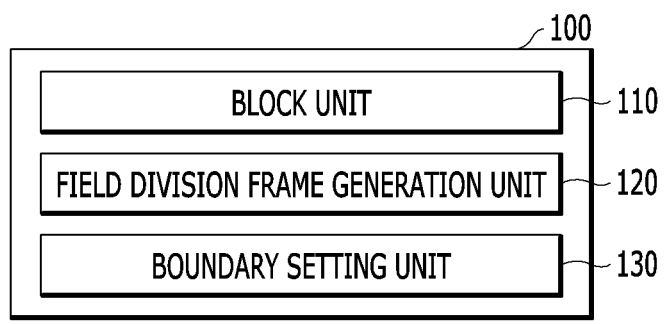
FIG. 1 is a diagram illustrating a configuration of a device for dividing a field boundary of a CAN trace according to an embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the terms "on", "above", "on an upper end", "below", "under", and "on a lower end" that are used to designate a position of one element with respect to another element include both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Prior to detailed description, a CAN (Controller Area Network) protocol refers to a standard communication method for bus-based networks which is widely used in the automobile industry. The CAN protocol specifies a method of data transmission between nodes on a CAN bus network, and a node on the CAN network refers to an electronic control unit (ECU). The ECU refers to an embedded system equipped with a sensor and an actuator. The ECU reads information about its surroundings using the sensor and performs a proper action through the actuator. In a vehicle, numerous ECUs are connected to a bus network to construct a communication environment. The CAN bus uses a twist pair cable including CAN_H and CAN_L as a data line, and all of nodes on the network are connected to these two lines and thus can receive all of messages transmitted on the bus. Each of the nodes in the CAN bus can perform communication by unit of frame.

The CAN protocol was designed without consideration of security. Accordingly, a lot of attacks targeting the CAN protocol have been reported so far. A physical access using an OBD-II port is the most representative method to access the CAN network in a vehicle. This method enables an attacker to collect packets on the CAN network and analyze functions of the packets using reverse engineering. Further, this method enables the attacker to inject his/her own CAN packet into the bus and thus cause malfunction of the vehicle. Through this process, the attacker can intrude into the CAN bus and modify information output by a specific ECU such as the dashboard in the vehicle or make the brake stop working and read or use values from a memory in a specific ECU.

As such, most of attacks targeting vehicles attempt to inject abnormal data into an in-vehicle CAN network to control a vehicle or cause deactivation and malfunction of some functions. As the vehicle-related technologies have developed, the increase in number of communication interfaces between a vehicle and the outside and number of electronic devices and software installed in the vehicle is inevitable. However, it is very difficult to completely prevent cyber-attacks thereon.

Accordingly, the present disclosure provides a device for dividing a field boundary of a CAN trace which can divide a data field within a CAN frame using protocol reverse engineering only for a CAN bus network. The protocol reverse engineering refers to the process in which the format or grammar of a private protocol whose standards are not disclosed is inferred in the absence of information about the protocol such as standard document, specification, etc. The protocol reverse engineering is used to test the safety of software in which a specific protocol is implemented and generates a significant test case based on a protocol model inferred using reverse engineering and thus enables a more effective test than a black-box test. Further, the protocol reverse engineering may be used to analyze a communication method of malicious software or to simulate a private protocol.

There are some difficulties in applying the conventional protocol reverse engineering to an in-vehicle network environment. This is because the conventional protocol reverse engineering infers the grammar or Finite State Machine (FSM) of a protocol mainly based on messages exchanged between targets in a client-server model. Meanwhile, as for a CAN protocol, numerous ECUs exchange messages to each other on a bus network and each message contains only the priority of the message and identifier information for identifying each message instead of the addresses of a sender and a receiver. Therefore, it is difficult to clearly identify sending/receiving ECUs for each message. Further, most of in-vehicle communication messages contain only binary information except under special circumstances. Therefore, it is difficult to expect the effect of the reverse engineering used for text-based message. Accordingly, the present disclosure suggests field division of a data field within a CAN frame by a device for dividing a field boundary of a CAN trace as part of the technology of detecting abnormality of a CAN bus.

FIG. 1 is a diagram illustrating a configuration of a device for dividing a field boundary of a CAN trace according to an embodiment of the present disclosure.

Referring to FIG. 1, a device 100 for dividing a field boundary of a CAN trace may include a block unit 110, a field division frame generation unit 120, and a boundary determining unit 130. The block unit 110 may collect a CAN trace of a CAN bus. For example, the block unit 110 may collect a trace of a CAN bus through an On-Board Diagnostics (OBD-II) port located within a vehicle.

FIG. 2 is a diagram illustrating a CAN trace collected by a device for dividing a field boundary of a CAN trace according to an embodiment of the present disclosure.

Like a network trace collected using a tool such as a Wireshark in a general Internet environment, a trace of a CAN bus may include main field value information of each frame as shown in FIG. 2. Each CAN frame may include the time of collection and values of an arbitration field, a Data Length Code (DLC) and a data field. The arbitration field is also referred to as an ID field, and an ID value refers to the priority assigned to each message exchanged between ECUs in each vehicle manufacturer or vehicle model. CAN frames having the same ID value in the collected CAN trace have the same DLC value and the same data field length.

In the collected CAN trace, about 22 to 25 different ECU IDs are present for each vehicle and more than half the IDs are transmitted at an interval of about 10 ms, and about 1,500 to 2,000 frames per second can be recorded for the entire network. The format of the collected CAN trace may vary depending on the environment where data are obtained even for the same kind of vehicle. For example, a trace collected from a vehicle which is started but stands in place and a trace collected from a vehicle which performs various operations such as acceleration, deceleration, turning on wipers and door locks, gear shift, and the like may be different in the kind of data recorded even if these traces are collected for the same time. Therefore, in order to perform more accurate field division, as many functions as possible installed in a vehicle are performed and a trace including various kinds of data is used. The device and method for dividing a field boundary of a CAN trace according to an embodiment of the present disclosure described below can be implemented to a trace of a CAN bus by using an arbitration field and a data field of each frame.

The block unit 110 may divide a CAN trace into multiple blocks including multiple frames of the CAN trace. The block unit 110 may select k number of blocks B0, B1 . . . Bk−1 each including n number of consecutive frames from a trace containing information about t number of CAN frames in total. That is, each of the multiple blocks may include a predetermined number, i.e., n number of consecutive frames of the CAN trace. Herein, n may be specified by a user.

The field division frame generation unit 120 may perform first static field division to each of the multiple blocks. The first static field division refers to division of a field having a fixed value from the other field by unit of bits in a corresponding block. The field division frame generation unit 120 may generate a first field division frame by performing the first static field division to each of the frames having the same ID value among frames included in each of the multiple blocks. The field division frame generation unit 120 may generate the first field division frame by expressing the fields having a fixed value as constant fields and the fields having a variable value as variable fields. For example, the first static field division performed by the field division frame generation unit 120 may be performed to allow each field to have a maximum size in order for each constant field and each variable field not to be adjacent to fields of the same kind, respectively.

FIG. 3 is a diagram illustrating an example of first static field division by a device for dividing a field boundary of a CAN trace according to an embodiment of the present disclosure.

There are various methods to perform static field division to a data field including bit streams. For example, the field division frame generation unit 120 may divide a constant field from a variable field using an exclusive OR (XOR) and an OR as illustrated in FIG. 3. If m number of frames having the same ID value in a single block and the frames have a data field value (bit stream) of l-bit size, a single bit stream may be expressed as d0, d1 . . . dm−1. For example, the l-bit may be 64-bit. The field division frame generation unit 120 may perform the first static field division between a first frame (corresponding to d0) among the m number of frames and an I-bit size bit stream S in which all of bits are 0. The first static field division refers to division of each of the multiple frames of the multiple blocks into a constant field having the same fixed value with respect to the same bit streams of each frame included in the block and a variable field having at least one different value between the same bit streams of each frame included in the block.

The field division frame generation unit 120 may perform an OR operation to the first frame and the bit stream S. Further, the field division frame generation unit 120 may perform an XOR operation to an operation result and a second frame (corresponding to d1). Then, the field division frame generation unit 120 may sequentially perform an XOR operation to m number of frames having the same ID value and generate a first field division frame by performing the first static field division to the m number of frames. The field division frame generation unit 120 may perform the first static field division to frames having the same ID value as described above in each of the multiple blocks. That is, the field division frame generation unit 120 may perform the first static field division to all of the blocks for single ID value. Further, the field division frame generation unit 120 may perform the first static field division to each of the ID values of the frames included in the blocks and may perform the first static field division to each block for each ID value.

The first field division frame may be composed of a bit stream in which a constant field has a value of 0 and a variable field has a value of 1 as a result of the XOR operation to two frames to which the first static field division is performed. If consecutive values of 0 and 1 in the bit stream are interpreted as a single group, the range of each group represents the range of a constant or variable field. Further, if the first static field division is performed to each ID value, it can be expressed as shown in the following Equation 1.

$$R_i = \{field_0, field_1 \ldots \}, (0 \leq i < k) \quad \text{[Equation 1]}$$

Herein, $R_i$ represents a first field division frame of an ith block and k represents the number of blocks. The first field division frame may be generated for each block and each ID. Therefore, the number of first field division frames can be as many as the product of the number of blocks and the number of IDs.

The boundary determining unit 130 may divide a final field boundary of the CAN trace by performing second static field division based on the result of the first static field division. The characteristics of CAN communication may be considered to derive a field boundary of the CAN trace. Specifically, a data field in a CAN frame may contain various sensor values measured by each ECU and setting values for control. The sensor values may have a predetermined range and a DLC of the CAN frame for each ID value is fixed, and, thus, when a protocol between ECUs is defined, a field in which the lengths of subfields are specified in data as in a general Internet protocol is not used. That is, in a protocol between ECUs, the locations and ranges for each bit are previously assigned to put various sensor values in a maximum 64-bit data field. If a specific sensor value needs to represent at most I number of information, at least $\log_2 I$ bits need to be steadily assigned to a data field to contain the sensor value. Since most of network protocols follow a big-endian order, if a small value enters at a particular point in time within this range, higher level bits on the left have a value of 0. It can be seen that due to this characteristic, if the number (n) of frames included in a block is appropriately regulated during a process of dividing a frame into blocks, sensor values can be changed within a predetermined range.

Based on the use of the characteristics of the CAN communication as described above, the final field boundary of the CAN trace can be divided through the first field division frame derived by performing the first static field division. The boundary determining unit 130 may perform the second static field division to the first field division frame for the same ID value. The first field division frame for the same ID value refers to a first field division frame generated by performing the first static field division to each block for each ID value as described above. In other words, the boundary determining unit 130 may perform the second static field division to data field values of all the frames corresponding to a specific ID value in the blocks B0, B1 . . . Bk−1 and thus derive a constant field and a variable field as an invariable part and a variable part, respectively, throughout the blocks. That is, the second static field division refers to division of each of the first field division frame into a constant field having the same fixed value with respect to the same bit streams of each first field division frame and a variable field having at least one different value between the same bit streams of each first field division frame. The boundary determining unit 130 may generate a second field division frame for each predetermined sensitivity based on the result of the second static field division. The sensitivity will be described later. The second static field division may be performed in the same manner as the above-described first static field division.

FIG. 4 is a diagram illustrating an example of subfield division by a device for dividing a field boundary of a CAN trace according to an embodiment of the present disclosure. The boundary determining unit 130 may determine a boundary for each variable field as illustrated in FIG. 3. The boundary determining unit 130 may determine the presence or absence of a field boundary of the second field division frame in sequence from the lowest bit stream of the second field division frame. The boundary refers to a boundary of a variable field with respect to a bit stream of the second field division frame. The boundary determining unit 130 may determine whether or not to determine a candidate field (pos_hpos_r) of lowest 1 bit on the leftmost in a range (pos_l⁻pos_r) of the second field division frame as a final boundary by increasing the size by 1 bit from the candidate field to the right.

For example, if a ratio of the number of blocks including a variable field and the total number of blocks in a bit stream of the first field division frame for the same ID value exceeds a predetermined threshold value, the boundary determining unit 130 may determine the bit stream including the variable field as the field boundary. In the case where the number of blocks including a variable field having a right boundary like a right boundary of the candidate field is u as a result of the second static field division to first field division frames R0 . . . Rk−1 for the same ID value, if u/k of the candidate field exceeds a predetermined threshold value (1-sen), the boundary determining unit 130 may determine a bit stream of the candidate field as a final field boundary. That is, the boundary determining unit 130 may divide a field boundary of the second field division frame based on the sensitivity. Herein, sen represents the sensitivity and the sensitivity may have a value of from 0 to 1. For example, as the sensitivity increases, a field boundary can be divided in more detail.

Figure 5:
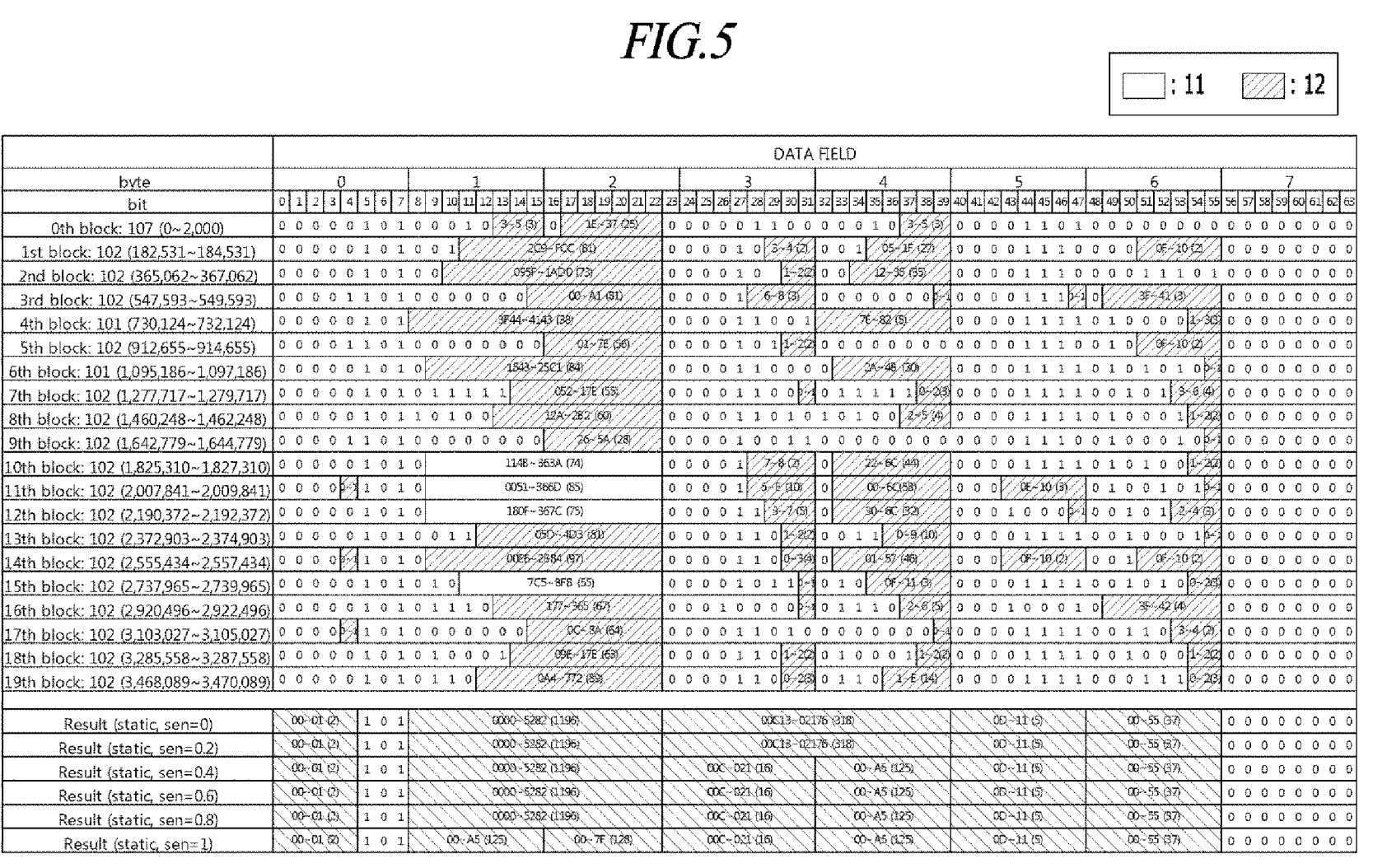

FIG. 5 is a diagram illustrating an example where a field boundary for each sensitivity is divided by a device for dividing a field boundary of a CAN trace according to an example of the present disclosure.

FIG. 5 illustrates a first field division frame 10 for each block and a second field division frame 20 with respect to the same ID value. FIG. 5 shows the first field division frame 10 for each block and the second field division frame 20 for each sensitivity with respect to CAN ID 0x220 of Kia Sorento R. Referring to FIG. 5, the boundary determining unit 130 may perform second static field division to the first field division frame 10 for the same ID value and perform an XOR operation between the same bit streams to produce the second field division frame 20. Further, the produced second field division frame may be generated as the second field division frame 20 for each sensitivity depending on the sensitivity. FIG. 5 illustrates the second field division frames 20 produced at sensitivities of 0. 0.2, 0.4, 0.6, 0.8, and 1. It can be seen from the second field division frame produced at sensitivity of 0 and the second field division frame produced at sensitivity of 1 that a field boundary for the sensitivity of 1 is divided in more detail than a field boundary for the sensitivity of 0.

Referring to FIG. 5, it can be seen that all the regions except a range of from an 8th bit to a 22nd bit follow a big-endian order and the locations of right boundaries in changed regions in the respective blocks are uniform as described above. In a range of from a 23rd bit to a 39th bit (first field division frame), a field boundary of a second field division frame is differently derived depending on the sensitivity, but in this range, there is no overlapped range between variable fields. Therefore, a boundary can be inferred as being between a 31st bit and a 32nd bit with a high probability. Meanwhile, in the range of from the 8th bit to the 22nd bit, a second field division frame is differently derived depending on the sensitivity and there is an overlapped range between constant fields. It can be seen that since a 16th bit in a 0th block is divided as a 1-bit constant field, a field boundary is derived as being between a 15th bit and a 16th bit by a variable field in a range of a 13th bit to the 15th bit in the 0th block at sensitivity of 1.

If a length of a constant field prior to the bit stream determined as the field boundary is equal to or smaller than a predetermined length Tm, the boundary determining unit 130 may merge the bit stream determined as the field boundary and a bit stream of the constant field. Referring to FIG. 5, if a length of a constant field (11 area) prior to a variable field (12 area) determined as a field boundary of a first field division frame in a certain block in the first field division frame 10 for each block is equal to or smaller than a predetermined length Tm, the variable field and the previous constant field can be merged into one field as shown in the second field division frame 20 for each sensitivity in FIG. 5. By merging the fields, the accuracy in field division in an actual CAN trace can be further improved. For example, if subfields in a 64-bit data field for a specific ID value are appropriately merged to each have 8-bit size and a trace containing only a small value in each field is analyzed, it is possible to obtain the optimum result close to a result of actual field division by the above-described merging process.

Hereinafter, the result of a test in which the above-described division of a field boundary is applied to an actual CAN trace a simulated trace will be described. The test is carried out by implementing Phython and performed by a laptop computer with Intel® Core™ i5-4278U 2.60 GHz processor, 16 GB memory, and Windows 10 Home 64-bit OS. The first field division frame and the second field division frame shown in FIG. 5 were also produced under the same conditions as described above.

The specification of a CAN higher level protocol used in an actual vehicle has not been known. Therefore, it is difficult to confirm the accuracy of the result of the test carried out to an actual CAN trace. Therefore, a virtual CAN trace may be generated by the device 100 for dividing a field boundary of a CAN trace according to a simulation model to verify the accuracy of the result of field division. In a CAN frame, subfields may be classified into four types: constant (const.); multi-value; counter; and sensor. That is, in a virtual CAN trace, the above-described four fields may be assigned with a certain size in a random order to each data field of a frame for each randomly generated ECU ID.

In the test described below, a network trace of a CAN bus having 10 IDs in total is generated. The following Table 1 shows the types and lengths of subfields randomly generated from a CAN message generated by simulation. The numbers in brackets represent the lengths of subfields, respectively.

TABLE 1

| ID | Fields |
|---|---|
| 1 | const (14), sensor (5), counter (10), const (6), sensor (4), multi-value (13), sensor (9), const (3) |
| 2 | multi-value (7), sensor (10), const (4), sensor (15), multi-value (15), sensor (12), counter (1) |
| 3 | counter (15), multi-value (6), counter (7), const (9), sensor (11), multi-value (12), multi-value (4) |
| ...... | |

The following Table 2 shows the properties according to the message format of ID 1 generated by simulation. A noise parameter in a sensor field is the maximum value of random noise.

TABLE 2

| Field type | Length | Properties |
|---|---|---|
| const | 14 | constant value=0x107D |
| sensor | 5 | amplitude=24, period=39095, base=8, phase=38489, noise=4 |
| counter | 10 | start=3 |
| const | 6 | constant value=0x17 |
| sensor | 4 | amplitude=6, period=15289, base=1, phase=11543, noise=1 |
| multi-value | 13 | Items=[3060, 892, 3860, 6052, 7892, 7436, 6653, 4832, 3672, 7473, 3487, 706] |
| sensor | 9 | amplitude=376, period=2288, base=67, phase=410, noise=75 |
| const | 3 | constant value=0x3 |

Each of the data fields generated by test has 64-bit size, and the sizes and types of subfields in the data fields for each ID are randomly generated. If a subfield is too big or too small, a CAN message to be generated may have a format quite different from that of an actual CAN message. Therefore, each field is limited in size to the range of from 4-bit to 16-bit. Each ECU transmits a frame every average 10 ms and generates about 300,000 traces in total during the whole simulation time of 300 seconds.

The criteria to evaluate the performance of field division are applied in the same manner as a field classification distance. According to the field classification distance, a distance between actual field division and inferred field division is measured on two criteria. The first criterion is the number of bits differently classified between an actual field and an inferred field among 0th to 63rd bits of a data field in a CAN frame. The second criterion is the number of field boundaries inferred differently from actual ones. The number of boundaries which are present as inferred boundaries although they are not actual field boundaries or not present as inferred boundaries although they are actual field boundaries is also counted. If the sum of these two distances is S, the maximum value of S is 127 and a final field classification distance is expressed as S/127. As the field classification distance has a smaller value, the result of inference is more accurate.

In the test, the results of three algorithms are compared. The first one includes first static field division and second static field division, the second one is a greedy algorithm, and the third one is a hybrid method including first static field division, second static field division, and a greedy algorithm. The result of field division obtained by the first static field division and the second static field division includes two types of fields, i.e., a constant field and a variable field. Therefore, in the present test, additional field type classification is performed to accurately measure a field classification distance and thus to derive the same four types of fields as in the previous study. To this end, each variable field is applied with the same criterion as the greedy algorithm depending on the number of values present only in a corresponding range and then classified again into one of multi-value, counter, and sensor. In the third method, the first method is applied first to derive the result of field division and then the greedy algorithm is partially applied only to each variable field of the result in an independent manner to divide the variable field into subfields.

Figure 6:
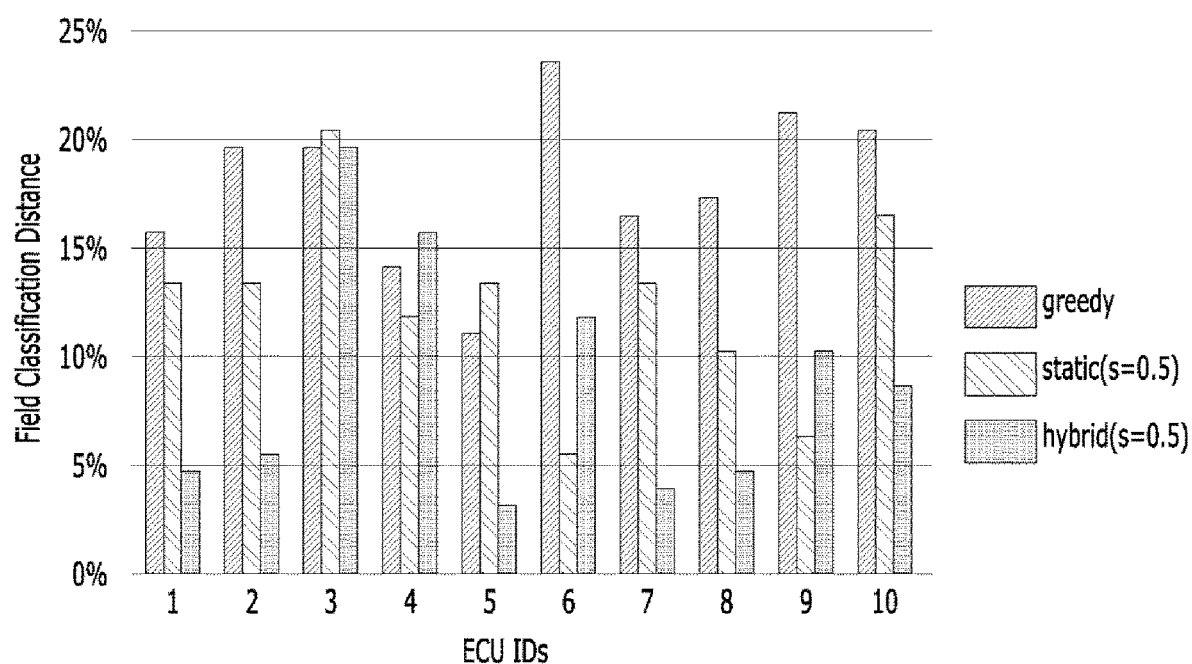
FIG. 6 is a diagram illustrating a field classification distance for each ID of an algorithm for a test using a device for dividing a field boundary of a CAN trace according to an embodiment of the present disclosure.

FIG. 6 is a diagram illustrating a field classification distance for each ID of an algorithm for a test using a device for dividing a field boundary of a CAN trace according to an example of the present disclosure.

FIG. 6 shows field classification distances for each ID derived by applying three algorithms to each of 5000 frames of the entire trace. Referring to FIG. 6, all the results except ID 3 and ID 4 confirm that the static field division and the hybrid method show better performance than the simple greedy algorithm. Particularly, the hybrid method shows the best results for more than half the IDs.

Figure 7:
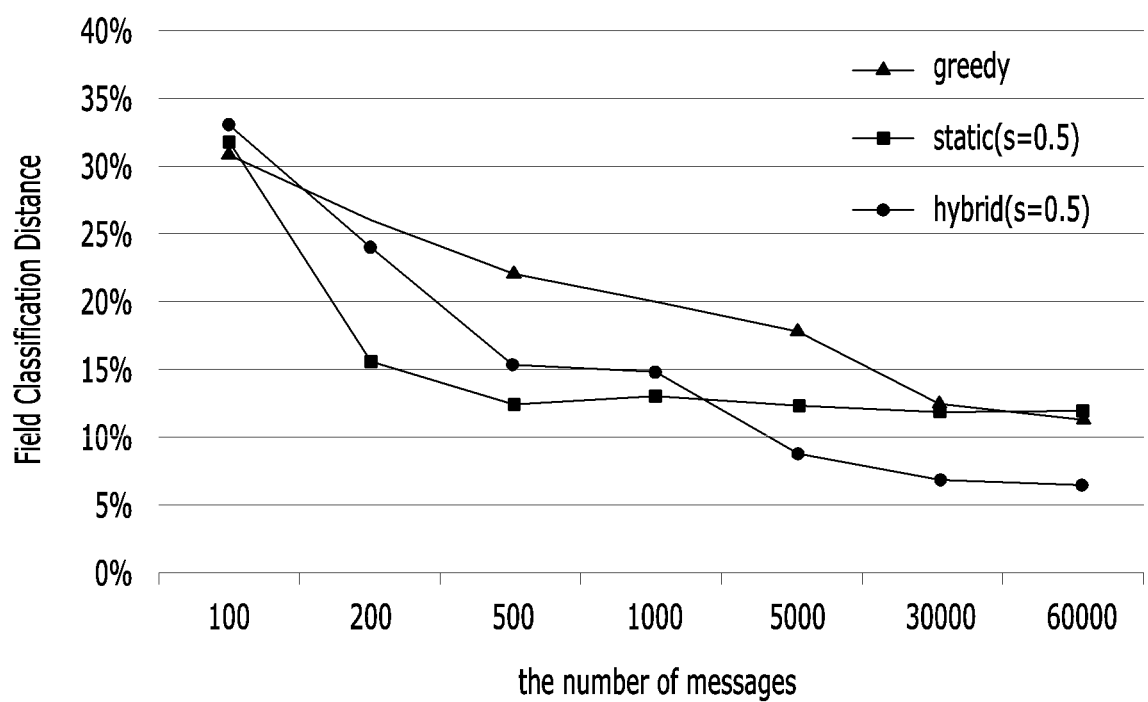
FIG. 7 is a diagram illustrating an average field classification distance for each algorithm for a test using a device for dividing a field boundary of a CAN trace according to an embodiment of the present disclosure.

FIG. 7 is a diagram illustrating an average field classification distance for each algorithm for a test using a device for dividing a field boundary of a CAN trace according to an example of the present disclosure.

Referring to FIG. 7, as the number of messages analyzed is increased, all of the three algorithms show smaller field classification distances. In the static field division, if the number of messages analyzed is greater than 500, a field classification distance is maintained at about 12% to 13%. In the greedy algorithm and the hybrid method, as the number of messages is increased, a field classification distance is decreased. Particularly, the hybrid method shows a better result for 5000 or more messages than the other two methods. The greedy algorithm, the static field division, and the hybrid method show field classification distances of 11.42%, 11.97%, and 6.61%, respectively, for 6000 messages.

Figure 8:
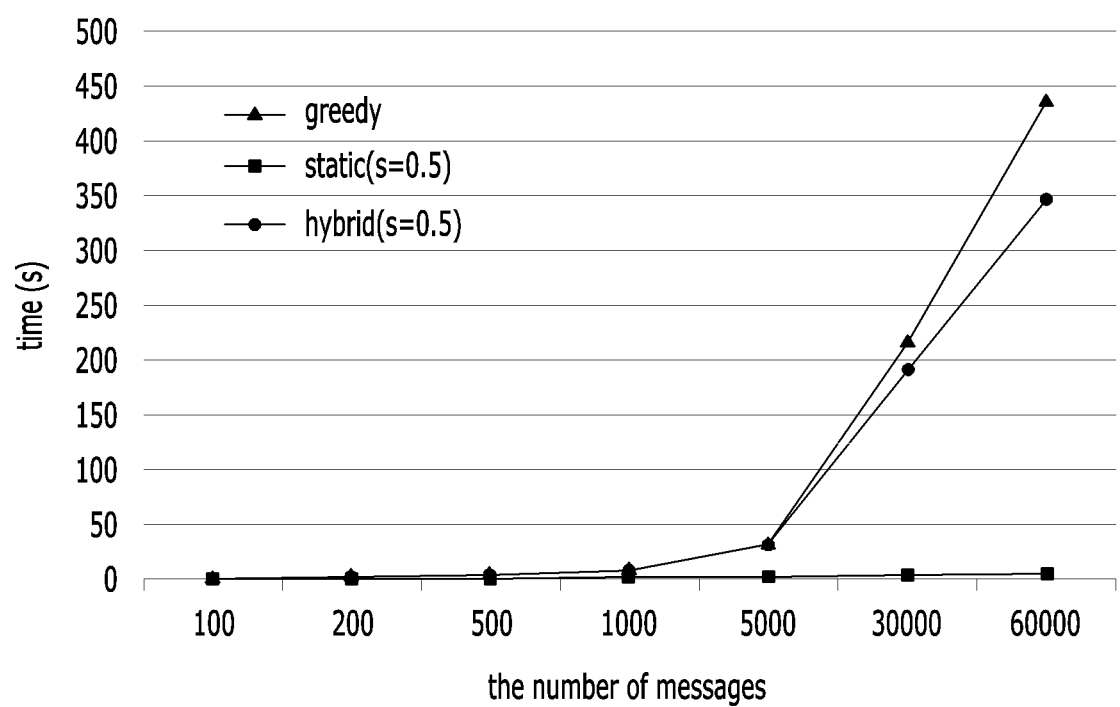
FIG. 8 is a diagram illustrating an execution time for each algorithm depending on the number of messages to be analyzed in a test using a device for dividing a field boundary of a CAN trace according to an embodiment of the present disclosure.

FIG. 8 is a diagram illustrating an execution time for each algorithm depending on the number of messages to be analyzed in a test using a device for dividing a field boundary of a CAN trace according to an example of the present disclosure.

Referring to FIG. 8, in the greedy algorithm and the hybrid method, as the number of messages is increased, the execution time is increased. However, the static field division is not greatly affected by the number of messages. In the static field division, only XOR and OR bit operations are performed, and, thus, it is possible to obtain a result very quickly. The greedy algorithm can obtain the same result as the static field division until a constant field is derived but requires unnecessary calculation and memory use to obtain the same result. This can be confirmed by less execution time for the hybrid method than for the greedy algorithm. The hybrid method is performed in the same manner as the static field division until a constant field is derived and thus can reduce the overheads for corresponding calculation. It can be seen from the test result that the greedy algorithm, the static field division, and the hybrid method require 438 seconds, 5.1 seconds, and 349 seconds, respectively, for 60,000 messages.

As described above, the device 100 for dividing a field boundary of a CAN trace which facilitates inference of a CAN higher level protocol, i.e., a boundary between subfields in a data field and a type of each field, different for each vehicle manufacturer and each vehicle model has been suggested. The device 100 for dividing a field boundary of a CAN trace may generate a first field division frame by performing first static field division. Further, the device 100 for dividing a field boundary of a CAN trace may perform second static field division and use the characteristics of data field values to generate a second field division frame in which boundaries are divided for each sensitivity. This method requires lower cost for calculation than the conventional greedy algorithm, and the hybrid method including the conventional method with the first static field division and the second static field division shows an improved inference result of field structure by about 42% on the basis of a field classification distance as compared to the conventional method. The more accurate field inference result for detailed format of a data field in a CAN frame can be applied to various technologies. In the technology of detecting an abnormal packet using a field structure model derived by CAN trace analysis, the more accurate field inference result makes it possible to reduce the error rate in detecting abnormalities. In case of using fuzzing to evaluate the safety of an in-vehicle network, it is possible to perform a test similar to generation-based fuzzing for a data field which is not disclosed by the vehicle manufacturer and thus possible to reduce the total number of test cases and the test time. Further, according to the device 100 for dividing a field boundary of a CAN trace, only four kinds of fields are defined as in the conventional method, and the effect is verified as described above by a simplified simulation as compared to actual CAN data. More versatile CAN data models will be needed in the future, and if data mining or some of conventional protocol reverse engineering technologies is added to the field division, higher accuracy can be expected.

Figure 9:
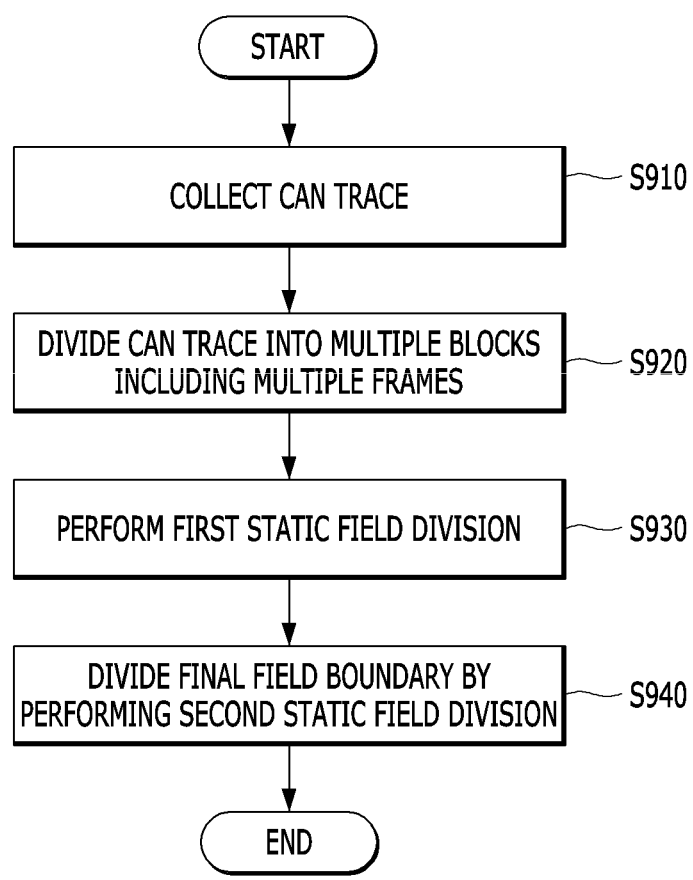
FIG. 9 is a diagram illustrating a flow of a method for dividing a field boundary of a CAN trace according to an embodiment of the present disclosure.

FIG. 9 is a diagram illustrating a flow of a method for dividing a field boundary of a CAN trace according to an example of the present disclosure.

The method for dividing a field boundary of a CAN trace according to an embodiment of the present disclosure illustrated in FIG. 9 can be performed by the device for dividing a field boundary of a CAN trace described above with reference to FIG. 1 to FIG. 8. Therefore, descriptions of the device for dividing a field boundary of a CAN trace illustrated in FIG. 1 to FIG. 8 may be identically applied to the method for dividing a field boundary of a CAN trace illustrated in FIG. 9, even though they are omitted hereinafter.

Referring to FIG. 8, in S910, the block unit 110 may collect a CAN trace of a CAN bus. For example, the block unit 110 may collect a trace of a CAN bus through an On-Board Diagnostics (OBD-II) port located within a vehicle.

In S920, the block unit 110 may divide the CAN trace into multiple blocks including multiple frames of the CAN trace. In this case, each of the multiple blocks may include a predetermined number of consecutive frames of the CAN trace.

In S930, the field division frame generation unit 120 may perform first static field division to each of the multiple blocks. The field division frame generation unit 120 may generate a first field division frame by performing the first static field division to each of frames having the same ID value among frames included in each of the multiple blocks. The first static field division refers to division of each of the multiple blocks into a constant field having the same fixed value with respect to the same bit streams of each frame included in the block and a variable field having at least one different value between the same bit streams of each frame included in the block.

In S940, the boundary determining unit 130 may divide a final field boundary of the CAN trace by performing second static field division based on the result of the first static field division. The boundary determining unit 130 may perform the second static field division to the first field division frame for the same ID value. The boundary determining unit 130 may generate a second field division frame for each predetermined sensitivity based on the result of the second static field division. The second static field division refers to division of each of the first field division frame into a constant field having the same fixed value with respect to the same bit streams of each first field division frame and a variable field having at least one different value between the same bit streams of each first field division frame.

Further, the boundary determining unit 130 may divide a field boundary of the second field division frame based on the sensitivity. Specifically, the boundary determining unit 130 may determine the presence or absence of a field boundary of the second field division frame in sequence from the lowest bit stream of the second field division frame. For example, if a ratio of the number of blocks including a variable field and the total number of blocks in a bit stream of the first field division frame for the same ID value exceeds a predetermined threshold value, the boundary determining unit 130 may determine the bit stream including the variable field as the field boundary.

Furthermore, if a length of a constant field prior to the bit stream determined as the field boundary is equal to or smaller than a predetermined length Tm, the boundary determining unit 130 may merge the bit stream determined as the field boundary and a bit stream of the constant field.

the method for improving the speed of estimation in an HEVC screen according to an embodiment of the present disclosure may be implemented in an executable program command form by various computer means and be recorded in a computer-readable storage medium. The computer-readable storage medium may include a program command, a data file, and a data structure individually or a combination thereof. The program command recorded in the computer-readable storage medium may be specially designed or configured for the present disclosure or may be known to those skilled in a computer software field to be used. Examples of the computer-readable storage medium include magnetic media such as hard disk, floppy disk, or magnetic tape, optical media such as CD-ROM or DVD, magneto-optical media such as floptical disk, and a hardware device such as ROM, RAM, flash memory specially configured to store and execute program commands. Examples of the program command include a machine language code created by a complier and a high-level language code executable by a computer using an interpreter. The hardware device may be configured to be operated as at least one software module to perform an operation of the present disclosure, and vice versa.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF REFERENCE NUMERALS

100: Device for dividing a field boundary of a CAN trace
110: Block unit
120: Field division frame generation unit
130: Boundary determining unit

We claim:

1. A method for determining a field boundary of a Controller Area Network (CAN) trace of electronic control units (ECUs) in a vehicle performed by a device for determining the field boundary of the CAN trace to detect abnormality in a CAN bus network, comprising:

collecting, by the device, the CAN trace the ECUs through a port of the vehicle while the vehicle performs a plurality of operations, wherein the ECUs are connected to a CAN bus of the vehicle and perform data transmission with each other based on a CAN protocol, each of the ECUs includes a sensor and an actuator for performing an action based on information obtained by the sensor, the collected CAN trace includes a plurality of frames, each of the plurality of frames including an ECU ID field and a data field, and the data field includes sensor values obtained by a corresponding ECU of the ECUs;

dividing, by the device, the CAN trace into multiple blocks each including multiple frames among the plurality of frames of the CAN trace, wherein the number of frames in each block of the multiple blocks is adjusted such that the sensor values are within a predetermined range;

performing, by the device, first static field division to each of the multiple blocks to generate first field division frames; and determining, by the device, a final field boundary of the CAN trace by performing second static field division based on the result of the first static field division, wherein the determining of the final field boundary of the CAN trace includes:

performing the second static field division to the first field division frames for the ECU ID, and generating a second field division frame for a predetermined sensitivity based on the result of the second static field division, wherein the determining of the final field boundary of the CAN trace includes:

sequentially determining presence or absence of a field boundary of the second field division frame from the lowest bit stream of the second field division frame, and determining the final field boundary based on the sequential determination of the presence or absence of the field boundary of the second field division frame, wherein when a ratio of a number (u) of blocks in which a variable field is included in a bit stream of each of the first field division frames for the ECU ID and a total number (k) of blocks exceeds a predetermined threshold value, the bit stream including the variable field is determined as the field boundary.

2. The method for determining a field boundary of a CAN trace of claim 1, wherein the performing of the first static field division includes generating first field division frames by performing the first static field division to each of frames having the ECU ID among the multiple frames included in each of the multiple blocks.

3. The method for determining a field boundary of a CAN trace of claim 2, wherein the second static field division is performed to divide each of the first field division frames into a constant field having a same fixed value with respect to the same bit streams of each first field division frame and a variable field having at least one different value between the same bit streams of each first field division frame.

4. The method for determining a field boundary of a CAN trace of claim 1,
wherein each of the multiple blocks includes a predetermined number of multiple consecutive frames in the CAN trace.

5. The method for determining a field boundary of a CAN trace of claim 1, wherein the first static field division is performed to divide each of the multiple blocks into a constant field having a same fixed value with respect to the same bit streams of each frame included in the block and a variable field having at least one different value between the same bit streams of each frame included in the block.

6. The method for determining a field boundary of a CAN trace of claim 1,
wherein if a length of a constant field prior to the bit stream determined as the field boundary is equal to or smaller than a predetermined length (Tm), the bit stream determined as the field boundary and a bit stream of the constant field are merged in the generating of the second field division frame.

7. A device for dividing determining a field boundary of a Controller Area Network (CAN) trace of electronic control units (ECUs) in a vehicle to detect abnormality in a CAN bus network, comprising:

a processor; and
a memory storing instructions executable by the processor, wherein the processor is configured to:
collect a CAN trace of the ECUs through a port of the vehicle while the vehicle performs a plurality of operations, wherein the ECUs are connected to a CAN bus of the vehicle and perform data transmission with each other based on a CAN protocol, each of the ECUs includes a sensor and an actuator for performing an action based on information obtained by the sensor, the collected CAN trace includes a plurality of frames, each of the plurality of frames including an ECU ID field and a data field, and the data field includes sensor values obtained by a corresponding ECU of the ECUs;
divide the CAN trace into multiple blocks each including multiple frames among the plurality of frames of the CAN trace, wherein the number of frames in each block of the multiple blocks is adjusted such that the sensor values are within a predetermined range;
perform first static field division to each of frames having the ECU ID among the multiple frames included in each of the multiple blocks to generate first field division frames;
and determine a final field boundary of the CAN trace by performing second static field division based on the result of the first static field division, wherein the processor is further configured to:
perform the second static field division to the first field division frames for the ECU ID, and generate a second field division frame for a predetermined sensitivity based on the result of the second static field division, sequentially determine presence or absence of a field boundary of the second field division frame from the lowest bit stream of the second field division frame, and
determine the final field boundary based on the sequential determination of the presence or absence of the field boundary of the second field division frame, wherein when a ratio of a number (u) of blocks in which a variable field is included in a bit stream of each of the first field division frames for the same ID value and a total number (k) of blocks exceeds a predetermined threshold value, the bit stream including the variable field is determined as the field boundary.

8. The device for determining a field boundary of a CAN trace of claim 7, wherein the first static field division is performed to divide each of the multiple blocks into a constant field having a same fixed value with respect to the same bit streams of each frame included in the block and a variable field having at least one different value between the same bit streams of each frame included in the block.

* * * * *